2,993,748
TREATMENT OF WOOL WITH ACID CHLORIDES IN THE PRESENCE OF DIMETHYLFORMAMIDE

Nathan H. Koenig, El Cerrito, Calif., assignor to the United States of America as represented by the Secretary of Agriculture
No Drawing. Filed Dec. 10, 1959, Ser. No. 858,835
10 Claims. (Cl. 8—128)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates broadly to the chemical modification of wool by reacting it with an organic acid chloride. In particular, the invention concerns and has as its prime object the provision of processes wherein the reaction of wool with organic acid chlorides is conducted in the presence of N,N-dimethylformamide, hereafter referred to as dimethylformamide. Further objects and advantages of the invention will be apparent from the following description wherein parts and percentages are by weight, unless otherwise specified.

Prior to this invention it has been advocated that wool be modified by applying an acid chloride to the wool followed by baking the treated wool in an oven. In another technique, the wool is heated with a solution of acid chloride in an organic solvent such as benzene or carbon tetrachloride. Under these conditions only a minor amount of acid chloride actually reacts with the wool so that the degree of modification is low.

In accordance with the present invention, wool is reacted, under essentially anhydrous conditions, with an acid chloride of the class consisting of aliphatic, aromatic, and aromatic-aliphatic acid chlorides, in the presence of dimethylformamide, at a temperature of about from 25° to 135° C. until the wool combines with about from 1 to 40% of its weight of the acid chloride. The dimethylformamide acts as a reaction promoter and promotes actual chemical combination of the wool and the acid chloride reactant. As a consequence one is enabled to readily prepare wools containing substantial proportions of combined acid chloride with correspondingly improved properties. Prior hereto, tertiary amines such as pyridine have been employed as promoters in reacting acid chlorides with compounds containing active hydrogen atoms, i.e., primary amines, alcohols, phenols, etc. It has now been established that dimethylformamide is at least as active as pyridine in promoting reaction between wool and acid chlorides. Moreover, dimethylformamide is effective in lesser proportion than pyridine, is cheaper than pyridine, and has a mild odor in contrast to the offensive odor of pyridine. Also, dimethylformamide involves a lesser toxicity problem than pyridine and less fire hazard because of a lower order of vapor pressure. Further, the high boiling point of dimethylformamide (153° C.) makes it possible to conduct the wool-acid chloride reaction at higher temperatures without requiring pressure-tight vessels or other special apparatus. All of these items indicate that dimethylformamide is a very useful promoter for the reaction in question and one which involves many advantages over agents previously described.

The unusual and effective action of dimethylformamide as a promoter for the reaction of acid chlorides with wool is exemplified by the following comparative tests: (a) Dry wool (1.2 g.) and myristoyl chloride (6 ml.) were heated for 30 minutes at 105° C. The wool was extracted with acetone and ethanol to remove unreacted reagents and dried. It was found that the uptake of acid chloride by the wool was only 4%. (b) Lauroyl chloride (6 ml.) was heated with dry wool (1.2 g.) at 105° C. for 60 minutes. The wool was extracted as described above and dried. The uptake of acid chloride by the wool was again only 4%. (c) Dry wool (1.2 g.) was heated with lauroyl chloride (5 ml.) and dimethylformamide (1 ml.) at 105° C. for 60 minutes. The wool was extracted as described above and dried. In this case, the uptake of acid chloride was 34%.

The fact that dimethylformamide acts as a reaction promoter rather than a mere solvent is demonstrated by the following experimental data: Dry wool (1.2 g.), myristoyl chloride (2 ml.), and dimethylformamide (4 ml.) were heated for 30 minutes at 105° C. The wool was extracted with acetone and ethanol to remove unreacted reagents and dried. It was found that the increase in weight of the wool, due to reaction with the acid chloride, was 30%. A series of experiments were then carried out under the same conditions but substituting for the dimethylformamide the same volume of the following solvents: butyl acetate, butyl ether, chlorobenzene, and xylene. In these runs, the uptake of acid chloride by the wool was only 4%. In a similar experiment, using methyl isobutyl ketone as the solvent, the uptake of acid chloride by the wool was 5%.

Carrying out the process of the invention essentially involves contacting wool with an acid chloride in the presence of dimethylformamide. The reaction conditions such as proportion of reagents, specific acid chloride used, time, temperature, etc., are not critical but may be varied to suit individual circumstances without changing the basic nature of the invention. The proportion of dimethyl formamide may be varied widely and may be as low as 0.1 volume per volume of acid chloride. In the case of acid chlorides which are normally solid, the volume considered is that of the molten (liquefied) compound. Usually, it is preferred to use a larger proportion of dimethylformamide, i.e., about 0.2 to 5 volumes thereof per volume of acid chloride, to attain an increased reaction promoting effect. The temperature of reaction may be about from 25° to 135° C. The reaction rate is increased with increasing temperature and a preferred temperature range to expedite the reaction without possibility of damage to the wool is 100–120° C. The effect of temperature on the rate of reaction is illustrated by the following: In a series of runs, lauroyl chloride (2 ml.) was reacted with dry wool (1.2 g.) in the presence of dimethylformamide (4 ml.) under varying conditions of time and temperature. Uptakes of lauroyl chloride obtained under these conditions were as follows:

| Reaction conditions | Uptake of lauroyl chloride on wool, percent |
|---|---|
| 25° C.—24 hours | 11 |
| 60° C.—2 hours | 18 |
| 105° C.—15 minutes | 23 |

Conventional inert solvents such as chlorobenzene, toluene, or xylene may be added to the reaction system. The use of a solvent is especially indicated where the acid chloride used is a solid and the proportion of dimethylformamide is not sufficient to dissolve the isocyanate. It is preferred to carry out the reaction under anhydrous conditions thereby to ensure reaction between the wool and the acid chloride and to suppress the formation of insoluble byproducts as mere coatings on the wool. The degree of modification of the wool is influenced by the proportion of acid chloride taken up by the fiber, that is, the higher the uptake of acid chloride the greater will be the modification of the wool. In general, the uptake of acid chloride may be varied about from 1 to 40% by weight. In conducting the reaction, the acid chloride is generally employed in excess over the amount desired to be taken up by the fiber. The time of reaction will vary depending on the proportion of dimethylformamide, temperature of reaction, reactivity of the acid chloride selected, and the degree of modification desired. In general, the reaction may take anywhere from a few minutes to several hours.

The process in accordance with the invention may be carried out in various ways. For example, the wool may be directly contacted with the dimethylforamide and acid chloride reactant and the reaction mixture preferably heated as indicated above to cause the acid chloride to react with the wool. In the alternative, the wool may be pretreated with dimethylformamide and the acid chloride then added to the mixture and the reaction carried out as previously described. The pretreatment may be carried out at normal temperature or with application of heat, i.e., at 25–135° C.

After reaction of the wool with the acid chloride, the chemically modified fiber is preferably treated to remove excess acid chloride, dimethylformamide, and solvent, if such is used. Thus, the fiber may be treated as by wringing, pressing between squeeze-rolls, centrifugation, or the like to remove the excess materials. In place of such mechanical action, or following it, the product may be extracted with an inert volatile solvent such as trichloroethylene, benzene, acetone, carbon tetrachloride, alcohol, etc. Successive extractions with different solvents may be used to assure complete removal of all unreacted materials.

By treating wool with acid chlorides as herein described, the wool is chemically modified because there is a chemical reaction between the acid chloride and the protein molecules of the wool fibers. As a result the modified wool exhibits many advantageous properties over normal wool. Several of these items are explained below:

An outstanding feature is the resistance of the modified wool to acids as indicated by its decreased solubility in hot hydrochloric acid. This factor enables the modified wool to be useful in applications where the product comes into contact with acidic materials. For example, wool may encounter acid conditions during manufacturing processes such as carbonizing to remove burrs; dyeing in acid dye baths; and fulling with acid media. The more resistant the wool is to such acid environments, the greater will be its subsequent mechanical strength and wear resistance.

The modified wool is more resistant to oxidizing conditions. Such conditions may be encountered in textile mills during bleaching or other finishing processes and also in use by the action of light and air. The increased resistance to oxidizing conditions is illustrated by the lowered solubility of the modified wool in the peracetic acid-ammonia test described hereinbelow.

The tendency of wool to shrink when subjected to washing in aqueous media has long been a deterrent to the more widespread use of wool. An important advantage of the invention is that it yields modified wools which have a decreased tendency to shrink when subjected to washing with conventional soap and water or detergent and water formulations.

Another advantage is that the modified wool displays increased resistance to yellowing. Thus where wool is originally prepared by scouring and other conventional cleaning methods from the raw fleece, it is essentially white in color. However, upon aging, the wool does not retain its whiteness but becomes more and more yellow. This color change is of course undesirable and restricts the use of wool mainly to applications wherein it is used in a dyed condition. It is believed that the yellowing of wool is caused at least in part by the action of light—the light in some way causing or accelerating chemical changes which give rise to colored compounds. However, it has been found that when wool is treated with acid chlorides in accordance with the invention, the tendency of the fiber to turn yellow is greatly diminished.

Resistance to penetration by water is a very useful property of textiles in the fabrication of garments intended for protection of the wearer from rain and humid conditions. Such resistance may be conferred upon wool by treatment in accordance with the invention, particularly by the use of acid chlorides having a long aliphatic chain, that is, through the use of aliphatic acid chlorides having 12 or more carbon atoms. This chemically-formed water resistance is more durable than coatings of hydrophobic material which come off during wear or cleaning because no chemical bonding is involved. Moreover, the chemically-modified fabric is not stiff as are many coated fabrics.

Wools reacted with long-chain aliphatic acid chlorides—such as myristoyl chloride, palmitoyl chloride, stearoyl chloride, oleoyl chloride, etc.—in accordance with the invention exhibit a softer and bulkier handle and good surface lubricity. Building-in such compounds, in accordance with the invention, is superior to merely adding coatings of softening, lubricating, or similar agents since the coatings are more easily removed by wear and exposure to chemical environments than are the chemically-bonded groups of the present invention.

The process of the invention not only provides protection against chemical attack but it also provides protection against the enzymes of biological oragnisms. Thus the products of the invention have enhanced resistance to attack by moths, carpet beetles, and other insect pests, and greater protection agains mildews, rots and oher fungi and bacteria.

Although the properties of the modified wool indicate beyond question that actual chemical combination between the wool and the acid chloride has taken place, it is not known for certain how the wool and acid chloride moieties are joined. It is believed, however, that the acid chloride reacts with some of the sites on the wool molecule where there are reactive hydrogen atoms, e.g., amino, hydroxyl, thiol, and phenolic groups. When the reaction is carried out with polybasic acid chlorides—for example, adipyl chloride—combination with the wool may establish cross-links between protein molecules of the wool that further increase the resistance of the fibers to chemical attack. It is to be particularly noted that the reaction in accordance with the invention does not impair the wool fiber for its intended purpose, that is, for producing woven or knitted textiles, garments, etc. Moreover, at low and moderate acid chloride uptakes, the chemical resistance of wool can be considerably improved without appreciably adversely affecting the tensile strength, hand, or color of the wool.

The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, etc.

The reaction promoting ability of dimethylformamide is not restricted to any particular acid chloride or class of acid chlorides. Consequently, the invention may be applied in the reaction of wool with all types of organic acid chlorides. Particularly preferred are the aliphatic, aromatic, or aromatic-aliphatic compounds containing one or more chloroformyl (—COCl) groups. These compounds may be hydrocarbon acyl chlorides or may contain substituents on the hydrocarbon residue such as halogen (chlorine, bromine, iodine, or fluorine), ether groups, ester groups, nitro groups, carboxy groups, etc. Examples of compounds coming within the purview of the invention are listed below by way of illustration and not limitation:

Typical examples of compounds in the category of aliphatic acid chlorides are acetyl chloride, propionyl chloride, butyryl chloride, isobutyryl chloride, valeryl chloride, isovaleryl chloride, trimethylacetyl chloride, caproyl chloride, caprylyl chloride, capryl chloride, lauroyl chloride, myristoyl chloride, palmitoyl chloride, stearoyl chloride, arachidoyl chloride, acrylyl chloride, crotonyl chloride, vinylacetyl chloride, methacrylyl chloride, angelyl chloride, oleoyl chloride, elaidoyl chloride, linoleoyl chloride, linolenoyl chloride, oxalyl chloride, maleyl chloride, fumaryl chloride, malonyl chloride, succinyl chloride, glutaryl chloride, adipyl chloride, pimelyl chloride, suberyl chloride, azelayl chloride, sebacyl chloride, chloroacetyl chloride, bromoacetyl chloride, iodoacetyl chloride, fluoroacetyl chloride, 9,10-dichloro-octadecanoyl chloride, ethoxyacetyl chloride, carbethoxyacetyl chloride, $\alpha,\beta$-dichlorosuccinyl chloride, 5-(chloroformyl)-valeric acid, cyclohexane-carbonyl chloride, etc. Of the aliphatic acid chlorides, it is preferred to employ the chlorides of aliphatic monobasic acids which contain at least 12 carbon atoms and the chlorides of aliphatic dibasic acids which contain at least 6 carbon atoms. These compounds are preferred as they confer on the treated wool especially desirable properties including resistance to acids, oxidizing agents, shrinkage, and water penetration.

Typical examples in the category of aromatic acid chlorides are benzoyl chloride, ortho toluyl chloride, meta toluyl chloride, para toluyl chloride, xyloyl chlorides, naphthoyl chlorides, dodecylbenzoyl chloride, orthochlorobenzoyl chloride, metachlorobenzoyl chloride, parachlorobenzoyl chloride, 2,4-dichlorobenzoyl chloride, anisoyl chloride, nitrobenzoyl chlorides, phthaloyl chloride, isophthaloyl chloride, terephthaloyl chloride, p-(chloroformyl)-benzoic acid, etc.

Typical examples in the category of aromatic-aliphatic acid chlorides are phenylacetyl chloride, chlorophenylacetyl chloride, cinnamyl chloride, $\beta$-phenylpropionyl chloride, phenoxyacetyl chloride, etc.

The invention is further demonstrated by the following illustrative examples—

Example I

A 0.6-gram sample of scoured, dry Lincoln wool was heated with 12 ml. of dimethylformamide and 6 ml. of myristoyl chloride for 45 minutes at 105° C. The treated wool was extracted with benzene and chloroform to remove unreacted reagents, and dried. The uptake of myristoyl chloride by the wool was 36%.

Example II

A 0.5-gram sample of dry mohair was treated under the same conditions as in Example I. The treated mohair was extracted with methanol and chloroform. The uptake of myristoyl chloride by the mohair was 39%.

Example III

Ten milliliters of stearoyl chloride and 15 ml. of dimethylformamide were mixed in an enamel tray and heated for 15 minutes at 105° C. A 3.5-gram swatch of dry wool flannel cut to the shape of the tray was added to the solution, and heating at the same temperature was continued for one hour. The cloth sample was then removed from the solution and extracted by several rinsings and wringings in warm acetone. The sample was then extracted for 16 hours with ethanol in a Soxhlet apparatus. The uptake of stearoyl chloride, calculated from the increase in dry weight obtained by the treatment, was 35.1%. A number of check samples that were heated with dimethylformamide only and then extracted showed no significant change in weight (0 to 2%). The results of the following analyses of the treated sample, compared with untreated wool, indicate that the wool and stearoyl chloride are chemically combined. All values are on a dry wool basis.

| Material | Total Nitrogen, percent | Total Sulfur, percent |
|---|---|---|
| Untreated wool, by analysis | 16.7 | 3.4 |
| Treated wool, by analysis | 12.0 | 2.4 |
| Treated wool, calculated for 35.1% uptake of stearoyl chloride | 12.4 | 2.5 |

Example IV

To a 1.2-gram sample of dry wool flannel, cut to fit in a Petri dish, was added 3 ml. of dimethylformamide and 3 ml. of myristoyl chloride. The reaction system was allowed to stand at room temperature (25° C.) for 24 hours. The treated fabric was extracted with acetone and ethanol, then dried. The uptake of myristoyl chloride by the wool was 8%.

Example V

A 1.2-gram sample of dry wool flannel was treated with 1 ml. adipyl chloride and 5 ml. dimethylformamide for 50 hours at 25° C. The treated wool was extracted as in Example IV and dried. The uptake of adipyl chloride was 14%.

Example VI

A 1.2-gram sample of dry wool flannel was heated with 1 ml. myristoyl chloride, 2 ml. dimethylformamide, and 3 ml. toluene for 1 hour at 105° C. The treated wool was extracted as in Example IV and dried; the uptake of myristoyl chloride was 14%.

Example VII

A series of runs were carried out wherein dry wool flannel was reacted with various acid chlorides in the presence of dimethylformamide. In these runs, the weight of dry wool was 1.2 grams and the temperature of reaction was 105° C. The acid chlorides used, the volume of reagents, the reaction time, and the uptake of acid chlorides are tabulated below—

| Acid chloride | Volume of acid chloride, ml. | Volume of dimethylformamide, ml. | Reaction time, min. | Uptake of acid chloride, percent |
|---|---|---|---|---|
| Acetyl chloride | 5 | 5 | 30 | 8 |
| Lauroyl chloride | 1 | 5 | 60 | 24 |
| Do | 2 | 5 | 30 | 25 |
| Myristoyl chloride | 1 | 5 | 60 | 36 |
| Stearoyl chloride | 2 | 4 | 30 | 21 |
| Do | 2 | 4 | 60 | 25 |
| Do | 2 | 3 | 30 | 20 |
| Chloroacetyl chloride | 0.5 | 9 | 60 | 10 |
| Phenylacetyl chloride | 2 | 4 | 20 | 20 |
| Anisoyl chloride | 1 | 9 | 60 | 6 |
| 2,4-Dichlorobenzoyl chloride | 1 | 5 | 30 | 7 |
| Succinyl chloride | 2 | 4 | 15 | 11 |
| Adipyl chloride | 1 | 9 | 70 | 15 |
| Do | 1 | 9 | 30 | 13 |
| Do | 2 | 4 | 75 | 18 |

Example VIII

The acid solubility of modified wools produced in accordance with the invention and that of untreated wool were determined in the following way: The wool sample is immersed in 4 N hydrochloric acid for one hour at 65° C. The loss in weight of the sample is then determined after thoroughly washing the acid-soaked wool. The increased resistance of modified wools to hot hydrochloric acid is illustrated by the data illustrated below:

| Acid chloride | Uptake of acid chloride by wool, percent | Acid solubility, percent |
|---|---|---|
| None (untreated wool) | 0 | 7 |
| Lauroyl chloride | 23 | 1 |
| Myristoyl chloride | 36 | 0.6 |
| Stearoyl chloride | 35 | 0.3 |

Example IX

Experiments were carried out to determine the resistance of the modified wools to oxidizing conditions by measuring their solubility in peracetic acid-ammonia. In this test, about 0.4 g. of wool is treated for 2 to 24 hours with 100 ml. of 2% peracetic acid and finally for at least 16 hours with 100 ml. of 0.3 N ammonium hydroxide. The loss in weight is determined after thorough washing with water. The percent increase in resistance is calculated as follows:

$$\text{Percent I(P/A)} = \left(\frac{\text{P/A of untreated wool} - \text{P/A of modified wool}}{\text{P/A of modified wool}}\right) \times 100$$

where:
Percent I(P/A) is the percent increase in resistance to peracetic acid-ammonia.
P/A is the loss in weight of the sample of modified (or untreated) wool divided by the original weight of the sample of modified (or untreated) wool.

The results obtained are tabulated below—

| Acid chloride | Uptake of acid chloride, percent | Increased resistance to peracetic acid-ammonia, percent |
|---|---|---|
| Phenylacetylchloride | 20 | 210 |
| Lauroyl chloride | 16 | 290 |
| Do | 22 | over 500 |
| Myristoyl chloride | 25 | 440 |
| Stearoyl chloride | 11 | 130 |
| Do | 20 | 300 |
| Do | 31 | over 500 |
| Adipyl chloride | 18 | 150 |

Example X

Tests were carried out to determine the improvement in shrinkage characteristics of the modified wools. The shrinkage tests were carried out as follows: The wool samples were milled at 1700 r.p.m. for 2 minutes at 40–42° C. in an "Accelerator" with 0.5% sodium oleate solution, using a liquor to wool ratio of 50 to 1. After this washing operation, the samples were measured to determine their area. The improvement in shrinkage properties of wool modified in accordance with the invention is demonstrated by the following data—

| Acid chloride | Uptake of acid chloride, percent | Area shrinkage, percent |
|---|---|---|
| None (untreated wool) | 0 | 49 |
| Lauroyl chloride | 33 | 2 |
| Myristoyl chloride | 34 | 0 |
| Stearoyl chloride | 26 | 4 |
| Chloroacetyl chloride | 6 | 11 |
| Adipyl chloride | 15 | 19 |
| Anisoyl chloride | 6 | 19 |

Example XI

Resistance to penetration by water was tested as follows. The fabric to be tested is placed on a wood board inclined about 35° to the horizontal plane. A 25-ml. buret is filled to the zero mark with distilled water and mounted vertically, eight inches above the center of the fabric. The stopcock is opened fully so that the water impinges on a single spot of the fabric. With untreated wool, using 10 ml. of water, the water penetrated the fabric. This was readily apparent, since the underside of the fabric and the wood were quite wet. The following treated fabrics were then tested:

Percent uptake
Myristoyl chloride _____ 36
Stearoyl chloride _____ 31

With both of these fabrics the underside of the fabric and the wood were dry, even after 25 ml. had been discharged from the buret, thus illustrating the increased resistance to water penetration of modified wools.

Example XII

To measure resistance to yellowing, treated samples and an untreated control were irradiated for 24 hours with a low pressure mercury vapor lamp as a source of ultraviolet rays. As a measure of yellowing, the percent reflectance—i.e., the percentage of light reflected from the samples—was measured with a photometer before and after irradiation. The reflectance values are an index of yellowing: the smaller the proportion of light reflected, the yellower the wool. The value of the treatment is shown by the following data, wherein the percent improvement in resistance to yellowing is calculated from the formula—

$$\left(\frac{IRC - FRC}{IRT - FRT} \times 100\right) - 100$$

where:
IRC = initial percent reflectance of untreated control.
FRC = final percent reflectance of untreated control.
IRT = initial percent reflectance of treated sample.
FRT = final percent reflectance of treated sample.

| Acid chloride | Uptake, percent | Initial reflectance, percent | Final reflectance, percent | Improvement in resistance to yellowing, percent |
|---|---|---|---|---|
| None (control) | 0 | 57 | 39 | 0 |
| Lauroyl chloride | 29 | 46 | 43 | 500 |
| Myristoyl chloride | 18 | 49.5 | 41.0 | 1.0 |
| Stearoyl chloride | 21 | 44.5 | 39.5 | 260 |

Having thus defined the invention, what is claimed is:

1. A process for chemically modifying wool which comprises reacting wool under essentially anhydrous conditions, in the presence of dimethylformamide, with an acid chloride of the class consisting of aliphatic, aromatic, and aromatic-aliphatic acid chlorides, at a temperature about from 25 to 135° C. until the wool combines with about from 1 to 40% of its weight of the acid chloride.

2. The process of claim 1 wherein the acid chloride is an aliphatic mono-basic acid chloride containing at least 12 carbon atoms.

3. The process of claim 1 wherein the acid chloride is lauroyl chloride.

4. The process of claim 1 wherein the acid chloride is myristoyl chloride.

5. The process of claim 1 wherein the acid chloride is palmitoyl chloride.

6. The process of claim 1 wherein the acid chloride is stearoyl chloride.

7. The process of claim 1 wherein the acid chloride is an aliphatic dibasic acid chloride containing at least 6 carbon atoms.

8. The process of claim 1 wherein the acid chloride is adipyl chloride.

9. The process of claim 1 wherein the acid chloride is suberyl chloride.

10. The process of claim 1 wherein the acid chloride is sebacyl chloride.

References Cited in the file of this patent

UNITED STATES PATENTS

| | | |
|---|---|---|
| 2,132,342 | Jackson | Oct. 4, 1938 |
| 2,333,623 | Rust | Nov. 2, 1943 |
| 2,386,631 | Pingree | Oct. 9, 1945 |
| 2,460,777 | Warden | Feb. 1, 1949 |
| 2,880,054 | Moore | Mar. 31, 1959 |